(12) United States Patent
Nakazawa et al.

(10) Patent No.: US 6,288,733 B1
(45) Date of Patent: Sep. 11, 2001

(54) IMAGE FORMING APPARATUS EMPLOYING DOTS OF A PREDETERMINED DIAMETER

(75) Inventors: Kazuhiro Nakazawa; Yasushi Koshimura; Toru Komatsu; Koichi Gunji, all of Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/536,805

(22) Filed: Mar. 28, 2000

(30) Foreign Application Priority Data

Mar. 31, 1999 (JP) .................................................. 11-090702

(51) Int. Cl.⁷ ............................. B41J 2/385; G03G 13/04; G03G 15/00
(52) U.S. Cl. ............................ 347/133; 347/131; 399/49; 399/72
(58) Field of Search ................................... 347/133, 131, 347/240, 251; 399/49, 72

(56) References Cited

U.S. PATENT DOCUMENTS

| | | | |
|---|---|---|---|
| 5,270,827 | * 12/1993 | Kobayashi et al. | 347/131 X |
| 5,572,330 | * 11/1996 | Sasanuma | 347/133 X |
| 5,805,192 | * 9/1998 | Sasaki et al. | 347/131 |

FOREIGN PATENT DOCUMENTS

| | | |
|---|---|---|
| 61-189575 | 8/1986 | (JP) . |
| 3-230177 | * 10/1991 | (JP) . |
| 7-25063 | 1/1995 | (JP) . |
| 8-289148 | * 11/1996 | (JP) . |
| 8-289153 | * 11/1996 | (JP) . |
| 2746942 | 2/1998 | (JP) . |

* cited by examiner

Primary Examiner—Susan S. Y. Lee
(74) Attorney, Agent, or Firm—Frishauf, Holtz, Goodman, Langer & Chick, P.C.

(57) ABSTRACT

An image forming apparatus includes a photoreceptor, an exposure device for exposing the photoreceptor with a laser beam dot by dot so as to form a dotted latent image on the photoreceptor, and a developing device for developing the dotted latent image with developer. The apparatus also includes a dot diameter correcting device for correcting a diameter of the dot formed on the photoreceptor. The dot diameter correcting device includes an image patch producing device for forming an image patch having a specific dot pattern with a laser beam having a predetermined power strength by the exposure device, an image patch detector for detecting a density level of the image patch formed on the photoreceptor, and a memory for storing data of laser power strengths with correlation to the detected density levels. With this structure, a controller controls laser power strength of the exposure device based on the correlated data stored in the memory and the density level detected by the image patch detector.

17 Claims, 8 Drawing Sheets

IMAGE PATCH

DENSITY LEVEL SENSOR C
(DOT DIAMETER SENSOR)

TO MEASURE IMAGE PATCH
DENSITY LEVEL BY
CHANGING LASER POWER

POWER STRENGTH 1

POWER STRENGTH 5

OUTPUT AS A CHANGE IN
IMAGE PATCH DENSITY LEVEL

FIG. 8 ized through pulse width modulation, and its density level is adjusted through adjustment of power of a laser diode. In this case,
IMAGE FORMING APPARATUS EMPLOYING DOTS OF A PREDETERMINED DIAMETER The present invention relates to an image forming method and an image forming apparatus, and in particular, to an electrophotographic image forming method and an electrophotographic image forming apparatus.

There has been available an electrophotographic image forming apparatus wherein a latent image is formed on a photoreceptor by a laser beam and an image is formed by developing the latent image.

In the course of obtaining an image in the image forming apparatus of this kind, an image is determined by adjusting the power of a laser beam and the exposure time thereof. As a method for adjusting the exposure time of a laser beam, there has been known PWM (pulse width modulation) which adjusts a period of time for turning on a laser with a pulse width.

Figure 7:
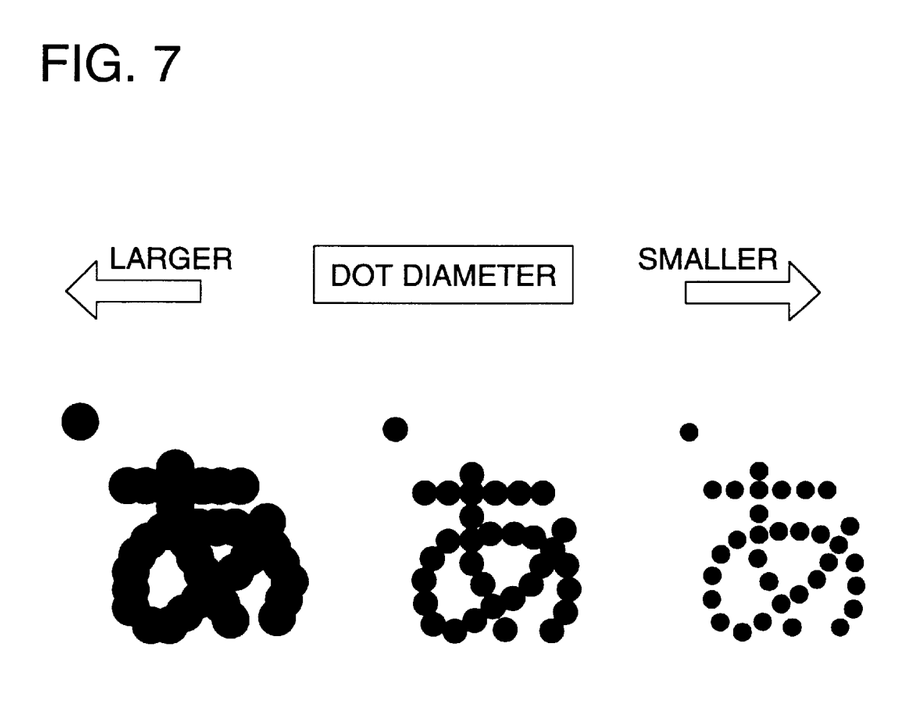
FIG. 7 is an illustration showing changes of dot images due to changes of the dot diameter.

With regard to a multiple-valued image by a laser writing system, constant gradation has been obtained by conducting γ curve correction based on laser power and a laser pulse width. Further, with regard to a binary image (one-bit image) based on data of 0 and 1 formed with one bit dot, its density level is stipulated by a halftone dot pattern, and when a diameter (an area) of each dot constituting halftone dots is changed, midscale density level as an image is changed. FIG. 7 is an illustrative diagram showing that a character image formed by dots of the same pattern becomes a blurred image or a weak image, if a dot diameter is changed, and image quality is changed. As is apparent from the diagram, an amount of toner used for one character is changed even in the case of a binary image if a dot diameter is changed, resulting in a change of toner consumption per one image sheet.

A diameter of a dot of the one-bit image is changed by fluctuation factors such as deteriorated sensitivity caused by deterioration of a photoreceptor, a contaminated optical system and deterioration of developing agents. It is therefore necessary to stabilize midscale density level of the one-bit image and to make an amount of consumption of toner to be constant.

Examples in the prior art under the aforesaid situation are as follows.

The first example in the prior art is the invention disclosed in Japanese Patent No. 2746942, and in that invention, a ratio of a main scanning line image-visualizing pattern is compared for obtaining a difference from the standard value established in advance, and thereby, a width of one line of laser diode power is corrected based on the result of calculation.

The second example in the prior art is the invention disclosed in TOKKAIHEI No. 7-25063, and in that invention, each of plural lasers provided is driven independently to form stipulated image density level, and detection and comparison of the density level are conducted to adjust an output level of a laser diode.

The third example in the prior art is the invention disclosed in TOKKAISHO No. 61-189575, and in that invention, a midscale density level image is made and visualized, then, detected by a sensor so that light emission intensity may be controlled in accordance with detected density level.

However, when the correction is made by detecting the main scanning line as in the first example in the prior art stated above, there is a problem that the line width in the main scanning direction can not be detected, although the line width in the sub-scanning direction can be detected.

Further, in the second example in the prior art stated above, it is possible to make each image formed by each of the plural lasers provided to be of the same density level, but, it is not possible to correct the change with time for image density level.

Figure 8:
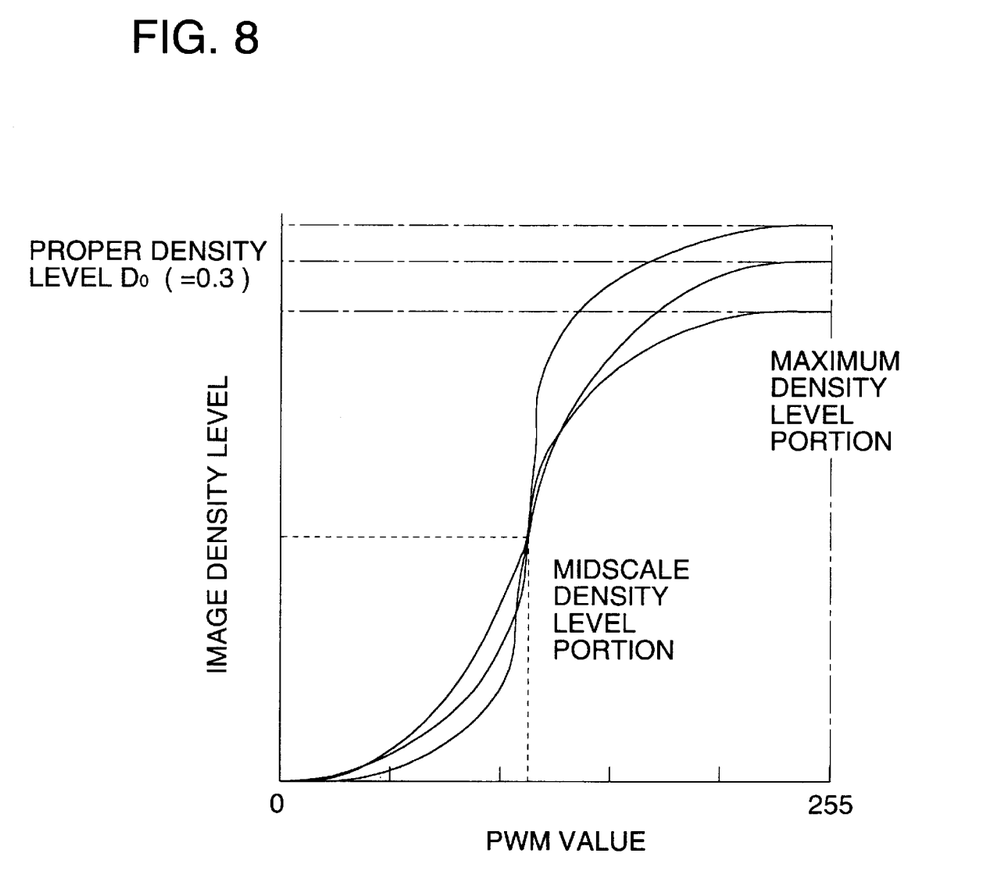
FIG. 8 is a diagram showing various $\gamma$ curves.

In the third example in the prior art mentioned above, each dot of middle tone image to be made is formed through pulse width modulation, and its density level is adjusted through adjustment of power of a laser diode. In this case, it is possible to adjust density level on the highest density level portion by matching midscale density level, if a density level curve (so-called γ curve) in the case of changing a pulse width is constant. However, the γ curve varies to the extent where γ correction needs to be conducted, and optimizing of density level on the halftone image formed by pulse width cannot necessarily make the density level of the highest portion (in the vicinity of the maximum value of pulse width) used on a one-bit image to be constant. FIG. 8 is an illustrative diagram showing fluctuation of the maximum density level portion caused by dispersion of the γ curve. For example, even when density level is optimized with m of PWM value, image density level is changed by dispersion of the y curve greatly on the maximum density level portion used by the one bit image.

SUMMARY OF THE INVENTION

The present invention has been achieved in view of the aforesaid points, and its object is to provide an image forming apparatus capable of correcting changes with time in image density level efficiently.

The above object can be attained by the following structures:

(1) An image forming apparatus is provided with a photoreceptor;

exposure means for exposing the photoreceptor with a laser beam dot by dot so as to form a dotted latent image on the photoreceptor corresponding to image information;

developing means for developing the dotted latent image with developer;

dot diameter correcting means for correcting a diameter of the dot formed on the photoreceptor, the dot diameter correcting means including, image patch producing means for forming an image patch having a specific dot pattern with a laser beam having a predetermined power strength by the exposure means, image patch detecting means for detecting a density level of the image patch formed on the photoreceptor, and memory means for storing data of laser power strengths with correlation to the detected density levels; and control means for controlling laser power strength of the exposure means based on the correlated data stored in the memory and the density level detected by the image patch detecting means.

(2) In the image forming apparatus of (1), the dot pattern of the image patch is arranged such that each dot is substantially isolated from other dots so as not to superimpose with other dots.

(3) In the image forming apparatus of (1), the dot pattern of the image patch is formed by one bit dot image with a predetermined number of dots.

(4) In the image forming apparatus of (2), the image patch is a half tone image having a reflection density level of 0.2 to 0.6.

(5) In the image forming apparatus of (2), the image patch detecting means comprises an image density level sensor to detect an average reflection density level of the image patch with diffused light.

(6) In the image forming apparatus of (1), the image patch producing means produces plural different image patches with plural different laser power strengths and the image patch detecting means detects a density level of each of the plural different image patches.

(7) In the image forming apparatus of (6), the memory stored the correlated data between the plural different image patches and the plural different laser power strengths and the control means obtains a relationship among the correlated data and obtains a laser power strength corresponding to a desired density level.

(8) In the image forming apparatus of (1), the image forming apparatus further comprises:

maximum density level correcting means for adjusting a developing ability of the developing means and for determining the maximum density, wherein the control means conducts correction by the maximum density level correcting means based on the laser power strength corrected by the dot diameter correcting means.

(9) In the image forming-apparatus of (1), the image forming apparatus further comprises:

gradation correcting means for correcting gradation characteristic by changing a pulse width of the laser beam, wherein the control means conducts correction by the gradation correcting means based on the laser power strength corrected by the dot diameter correcting means.

(10) In the image forming apparatus of (1), the image patch detecting means comprises an image density level sensor to detect an average density level of the whole of the image patch.

(11) In the image forming apparatus of (10), the image density level sensor detects the average density level by utilizing diffused light.

(12) In the image forming apparatus of (1), the image patch producing means produces the image patch on the photoreceptor in such a manner that the exposure means forms a latent image on the photoreceptor and the developing means develops the latent image so as to form the image patch on the photoreceptor, and the image patch detecting means detects a reflection density level of the image patch on the photoreceptor.

(13) In the image forming apparatus of (1), the image patch producing means produces the image patch on the photoreceptor in such a manner that the exposure means forms a latent image on the photoreceptor as the image patch, and the image patch detecting means detects a density level of the image patch by detecting an electric potential of the image patch on the photoreceptor.

(14) In the image forming apparatus of (1), the image patch producing means produces plural different image patches with plural different laser power strengths and wherein the plural different image patches have the same number of dots respectively.

(15) In the image forming apparatus of (1), the image patch producing means produces plural different image patches with plural different laser power strengths, the image patch detecting means detects a density level of each of the plural different image patches, and the control means obtains a laser power strength for a desired density level.

(16) In the image forming apparatus of (12), the control means comprises a counter to count a number of image formations or to count hours used for image formation and controls the image patch producing means and the image patch detecting means so as to obtain a laser power strength for a desired density level for every predetermined number of image formations or for every predetermined hours used for image formations.

(17) In the image forming apparatus of (13), the control means comprises a counter to count a number of image formations or to count hours used for image formation and controls the image patch producing means and the image patch detecting means so as to obtain a laser power strength for a desired density level for every predetermined number of image formations or for every predetermined hours used for image formations.

Further, in order to attain the object stated above, as a preferable example, the invention may be represented by an image forming method to form, on a photoreceptor, an electrostatic latent image corresponding to image information with a laser beam emitted from a laser, and to develop the electrostatic latent image to obtain a visible image, wherein an image patch having the prescribed pixel density is formed on the photoreceptor through change of output of the laser beam, then, the image patch is developed, density level of the developed image patch is detected, and based on information of the detected density level, an output of the laser beam which makes the image patch having the prescribed pixel density to be of the prescribed density level is obtained, and an image is formed by the obtained laser beam output.

DETAILED DESCRIPTION OF THE PREFERRED EMBODIMENT

An embodiment of the invention will be explained as follows, referring to drawings.

Figure 1:
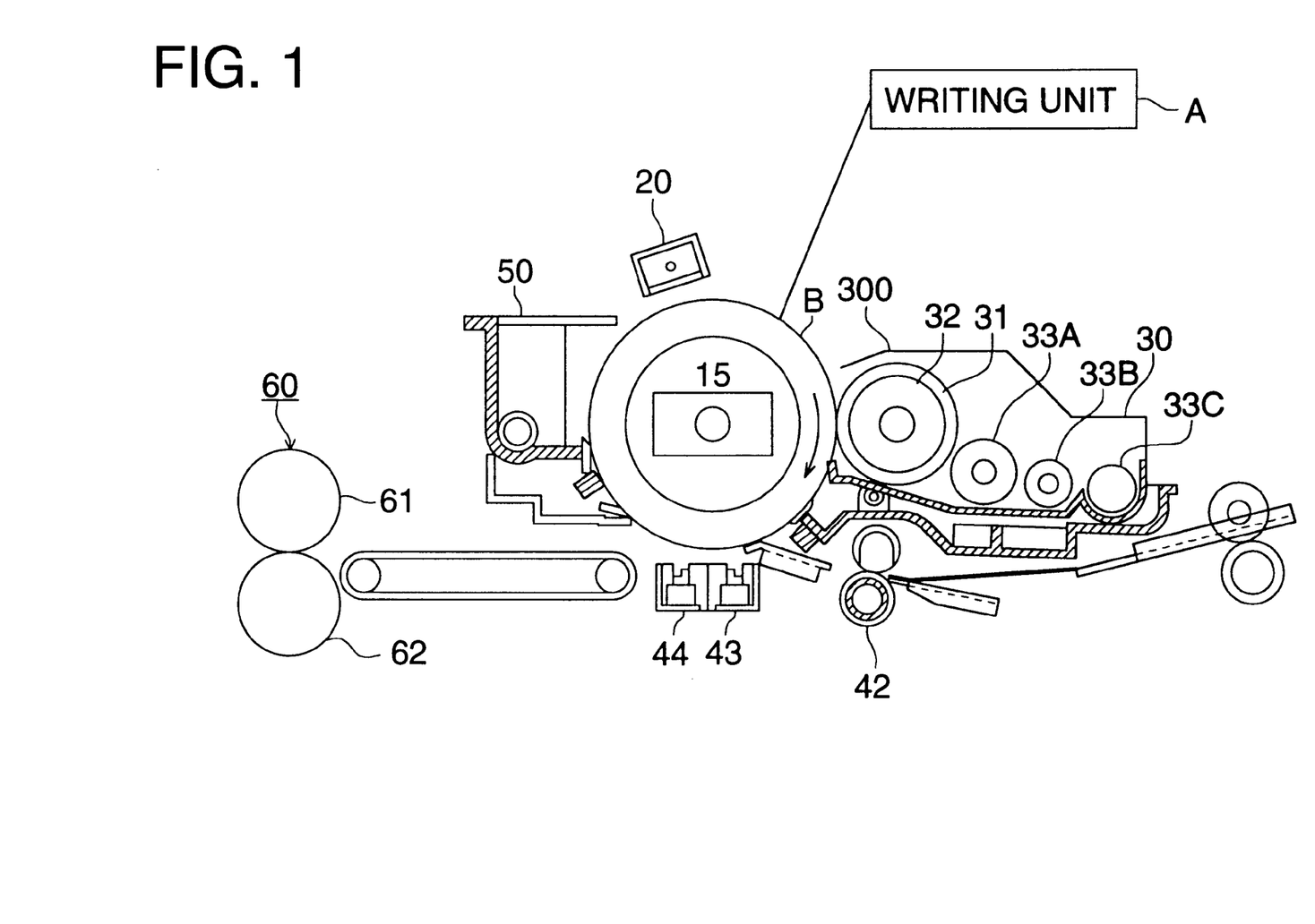
FIG. 1 is a sectional view showing a schematic mechanism in an embodiment of an image forming apparatus of the invention.

FIG. 1 is a sectional view showing a schematic mechanism in an embodiment of an image forming apparatus of the invention.

In FIG. 1, image carrier B is an 80 mm diameter drum-shaped photoreceptor composed of a coated type OPC which rotates in the direction of an arrow mark at a speed of 280 mm/sec or 125 mm/sec and is charged negatively, and on a shaft of the image carrier B, there is provided encoder 15 for detecting the phase which transmits phase signals showing the phase of the image carrier B to control means 1 which will be described later.

Around the image carrier B, there are provided writing unit A which will be explained later, charging unit 20, developing unit 30, separation unit 44, transfer unit 43 and cleaning unit 50, and there is further provided a sheet feeding system composed of a sheet feeding tray, registration roller 42 and a conveyance belt.

The writing unit A makes a semiconductor laser to emit light based on recording signals read out of a page memory or on patch recording signals for recording an image patch which will be explained later, and thereby forms a latent image by conducting line scanning on the image carrier B for each dot, which means that the writing unit A is one conducting an exposure process.

Charging unit 20 is, for example, a scorotron charging unit, and it is one for conducting uniform charging on the image carrier B at prescribed voltage prior to a latent image forming process and for preventing photographic fog by adjusting tone reproduction.

Developing unit 30 is one wherein developing agents in which toner composed of polyester type material having an average particle size of about 8.5 μm and ferrite type coating carrier having an average particle size of about 60 μm are adjusted to create toner concentration of 4–6% are stirred by rotation of stirring screws 33A, 33B and 33C at a rate of 120 rpm, then a magnetic brush is formed on an outer circumferential surface of developing sleeve 31 which is outside magnet roller 32 and rotates at a rate of about 400 rpm or 180 rpm, and then, prescribed bias voltage is impressed on the developing sleeve 31, and a latent image on the developing area facing the image carrier B is visualized to be a toner image.

With regard to developing unit 30, a shaft of magnet roller 32 covered by 40 mm diameter sleeve 31 in the vicinity of an opening of enclosure 300 which faces image carrier B is fitted in a side wall of the enclosure 300, and driving shafts of 16 mm diameter stirring screws 33A, 33B and 33C are fitted in the side wall of the enclosure 300 to be behind the magnet roller. Thus, rotational frequencies of driving shafts for the sleeve 31 and stirring screws 33A, 33B and 33C can be changed when they are connected with, for example, a driving system (not shown) through gears. This control operation is conducted by control means 1. By using this function, the control is made to fix the maximum image density level by changing the rotational frequency of, for example, the sleeve 33 to, for example, 200 rpm, 250 rpm and 300 rpm.

As is widely known, transfer unit 43 is one wherein transfer sheet P is superposed on a toner image held electrostatically on image carrier B, and the toner image is transferred onto the transfer sheet P when the transfer sheet P is subjected to discharging from its reverse side, and a scorotron discharging unit is preferable. However, the invention is not limited to the scorotron discharging unit, and it has only to be one for transferring a toner image on transfer sheet P electrostatically such as a corotron charging unit or a charging roller.

As is widely known, separation unit 44 is one for separating transfer sheet P by neutralizing the transfer sheet P stuck electrostatically to the image carrier B, and a scorotron charging unit, a corotron charging unit and a charging roller are used.

Cleaning unit 50 makes a blade to be in contact with the surface of the image carrier B and thereby scrapes off toner and dust sticking to the surface of the image carrier B to collect them in a waste toner box. Density level sensor C is a density level sensor for detecting density level of an image patch visualized on the image carrier B.

As is widely known, fixing unit 60 is a unit for fixing a toner image on transfer sheet P permanently by applying heat or heat plus pressure on transfer sheet P carrying a toner image, and lower roller 62 thereof is one which is made through LTV (abbreviation of low temperature vulcanizing) and is PFA (tetrafluoroethylene-perfluoroalkylvinylether copolymer) coated to have a thickness of 70 μm and to have rubber hardness of 30°, and a 200 W electric heater is housed therein. While, upper roller 61 is one formed with core metal material of A5056TD (aluminum) having a diameter of 50 mm and a length of 324 mm, and its surface is PFA-coated, and a 1100 W electric heater (not shown) is housed therein.

Figure 2:
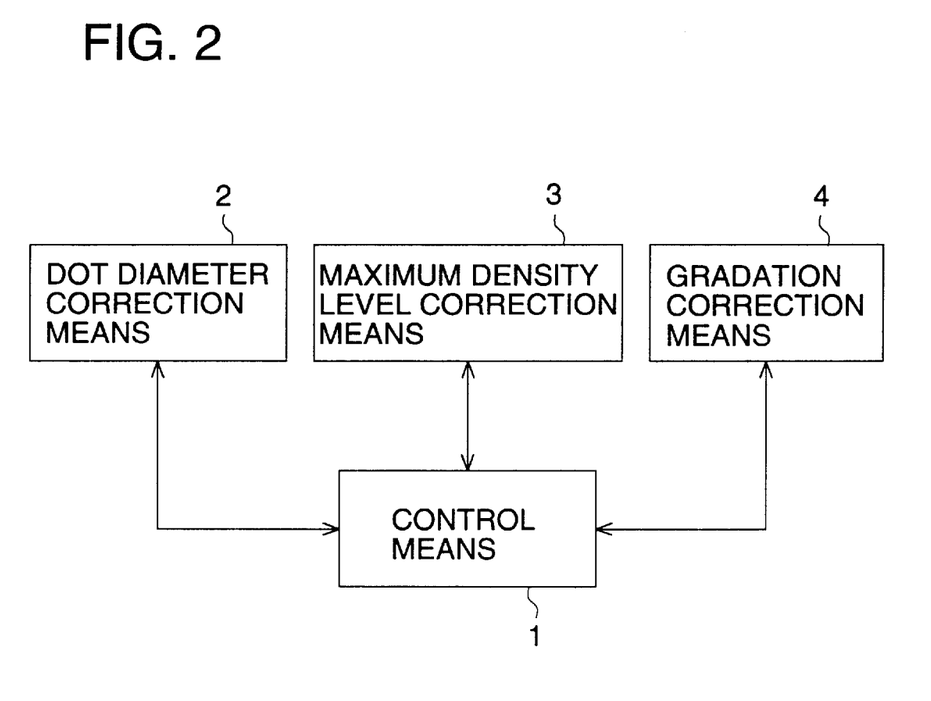
FIG. 2 is a block diagram showing the structure of the main portions in an embodiment of an image forming apparatus of the invention.

FIG. 2 is a block diagram showing the structure of primary portions in an embodiment of the invention.

An image forming apparatus of the present embodiment is one employing an electrophotographic system wherein an exposure process is conducted by a semiconductor laser, and an example is one wherein a gradation image is expressed by the number of dots formed by a laser beam in a certain area.

As shown in FIG. 1, an image forming apparatus in the present embodiment has therein dot diameter correction means 2 which corrects a diameter of a dot formed by a laser beam, maximum density level correction means 3 which corrects the maximum density level, gradation correction means 4 which corrects image gradation and control means 1 which controls the dot diameter correction means 2, maximum density level correction means 3 and gradation correction means 4.

Figure 3:
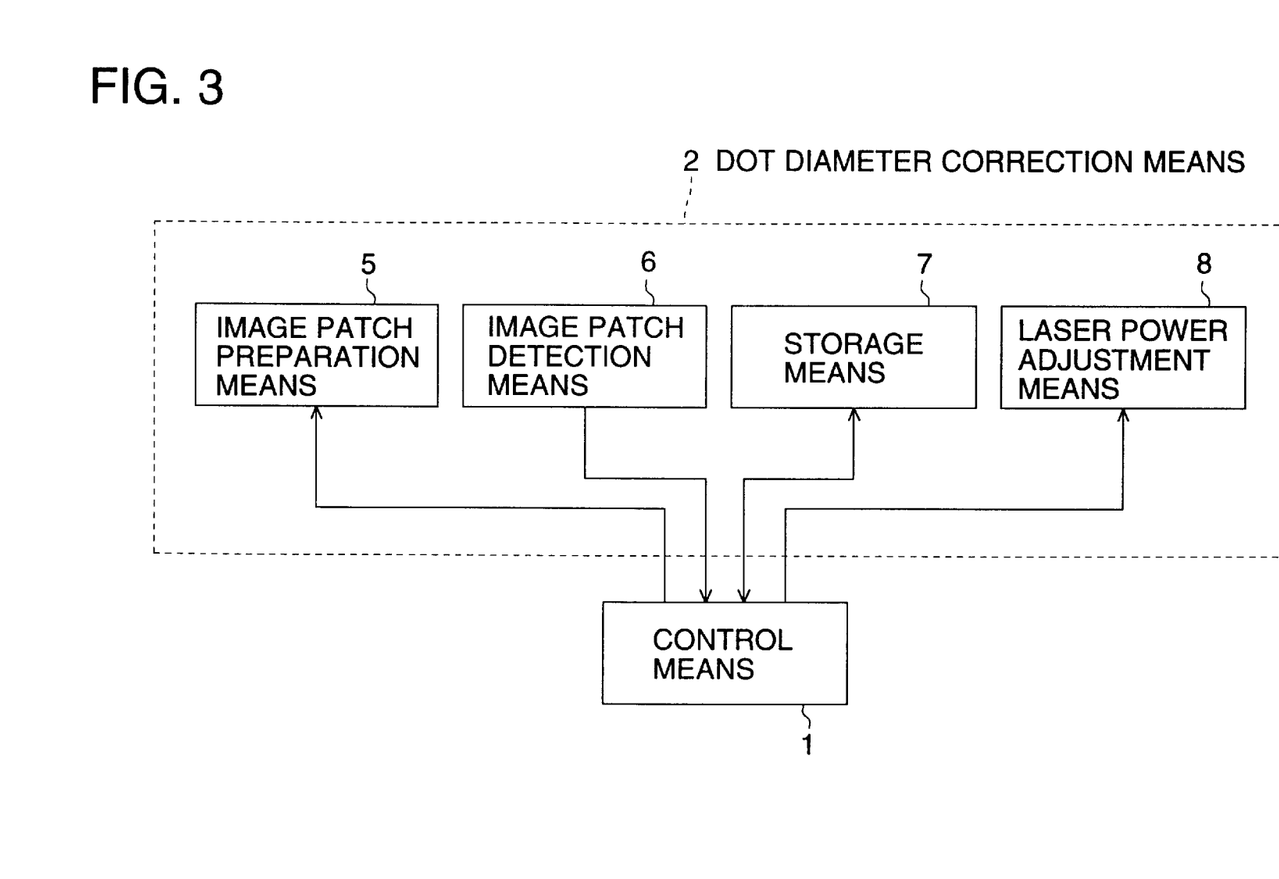
FIG. 3 is a block diagram showing the structure of a dot diameter correction means shown in FIG. 2.

FIG. 3 is a block diagram showing the structure of dot diameter correction means 2 shown in FIG. 2.

As is shown in FIG. 3, the dot diameter correction means 2 has therein image patch making means 5 which makes an image patch on image carrier B, image patch detection means 6 which detects density level of an image patch on image carrier B, storage means 7 which stores parameters such as a power value for making a semiconductor laser to emit light, and laser power adjustment means 8 which makes a semiconductor laser to emit light by using the power value stored in the storage means 7.

Incidentally, maximum density level correction means 3 and gradation correction means 4 which are shown in FIG. 2 have been provided in the prior art. Therefore, detailed explanation of them are omitted here. The maximum density level correction means 3 is a means to adjust developability by changing Vs/Vp representing a ratio of rotational frequency Vs of sleeve 31 to rotational frequency Vp of image carrier B, and thereby to determine the maximum density level. The gradation correction means 4 is a means to adjust gradation by changing a pulse width of a laser with PWM and thereby to correct a γ curve.

Next, operations in the present embodiment will be explained.

Control means 1 first corrects, with dot diameter correction means 2, a diameter of a dot which is exposed by a laser and visualized by a developing unit. In the dot diameter correction means 2, an image patch is first made by image patch producing means 5.

The image patch producing means 5 has therein writing unit A shown in FIG. 1 which forms an image patch representing a latent image on image carrier B. After that, the image carrier B rotates and the image patch stated above is developed by developing agents in the developing unit 30.

When producing an image patch, a pulse width per one dot is fixed at the prescribed value, for example, in the vicinity of the maximum density level (near the PWM value X).

With regard to the image patch, it is preferable to make plural different image patches by changing the laser power strength, and in the example, 6 different image patches are made by changing the laser power such as 6 different power strengths. With regard to laser power that makes each image patch, it may be made to be different at a constant interval within a range of variable width of laser power, or it may be changed before and after the power used in the current image forming.

Figure 5:
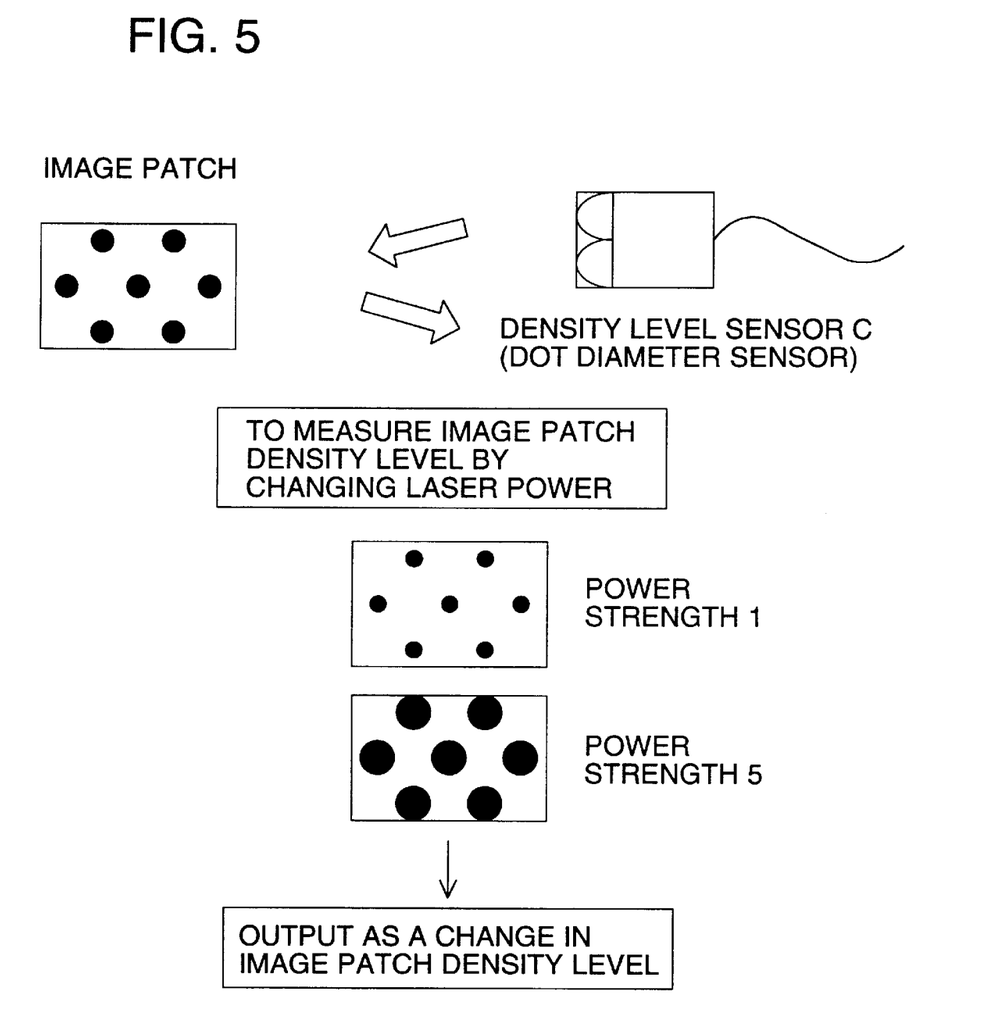
FIG. 5 is an illustration showing image patches produced by changing laser power strength.

The image patch has only to be formed with one-bit dot image (dot image pattern) wherein dots are formed in a certain area at certain density (a certain number of dots) as shown in FIG. 5. The dot image pattern is formed through an appropriate method such as an error diffusion method, a screen method or other original dot arrangement method. With regard to an image patch pattern to be made, it is preferable that each dot is isolated mutually. Thus, a halftone image is formed in the form of a binary image by the dot pattern of dots isolated each other.

It is preferable that the image patch which is a group of the dots shows halftone on the level corresponding to 0.2 to 0.6 when the image patch is measured as macroscopic reflection density level, and it is preferable that the density level of the image patch is a level at which the change in size of each dot can be detected sensibly as a difference of reflection density level by a density level sensor. In the example, dot arrangement is made so as to be equivalent to reflection density level of 0.3.

Further, it is preferable that a size of the image patch is about 20 mm×30 mm which can be measured accurately by the density level sensor.

Figure 6:
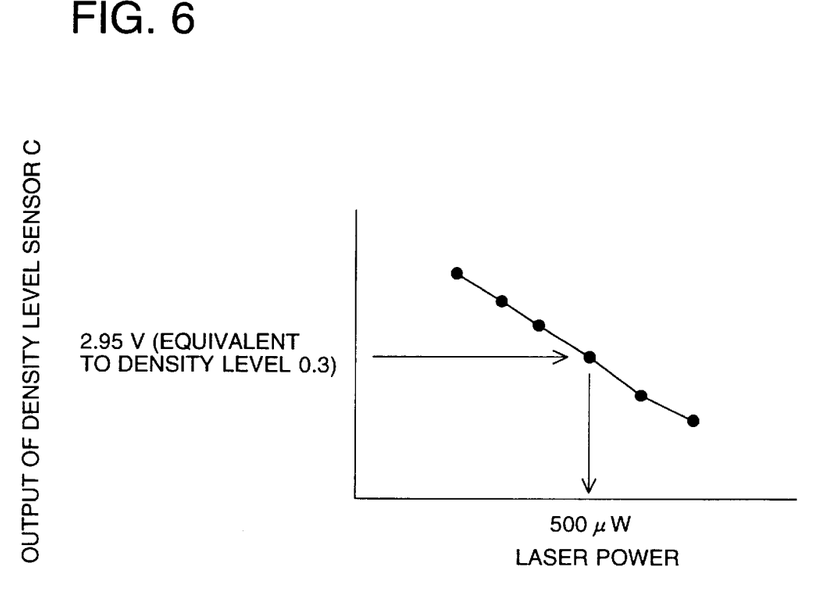
FIG. 6 is a diagram showing a relationship between laser power and output of a density level sensor C.

Next, the image patch detection means 6 detects the density level of each of plural different image patches by means of reflection density level sensor C and outputs changes in macroscopic image density level. The plural different image patches are produced by changing a size of each dot by changing a laser power by the image patch producing means 5. FIG. 6 is an illustrative diagram wherein patch density levels are detected by the image density level sensor C, and a change in dot diameter is detected as a change in density level sensor output.

The density level sensor C does not measure a diameter or an area of each dot in an image patch, and only detects a mean density level of the whole of the image patch, and for example, a sensor utilizing diffused light is preferable.

Next, control means 1 obtains relationship between laser power strengths and density levels of image patches from density levels of image patches detected by the image patch detection means 6, as shown in FIG. 6. In the case of linear approximation, the least square method can be used for calculation. If the image patch thus made is formed with an appropriate dot diameter, density level output of a predetermined value as macroscopic reflection density level is obtained. In the example, an image patch having a density level equivalent to 0.3 was used, or a patch having 2.95 V as density level output of a reflection density level sensor was prepared. In other words, under the laser power by which a reflection density level output of 2.95 V is obtained, a patch is made with an appropriate dot diameter. In this way, a laser power output value by which an appropriate density level sensor output value can be obtained is selected and is stored in storage means 7. Namely, the stored value represents a laser power value by which an appropriate image density level to be $D_0$ (for example, equivalent to 0.3) can be obtained in the case of pulse width of X.

When the relationship between the laser power and image patch density level output is known in advance (for example, the relationship is prepared in a correction table and a calculation expression), it may be permissible that image patch producing means 5 produces only a single image patch, and a density level of this patch is detected by image patch density level detection means 6, thus, an appropriate laser power output can be obtained by correcting the detected patch density level.

In laser power adjustment means 8 shown in FIG. 3, operations are made to conduct image forming thereafter by using the laser power stored in the storage means 7.

Incidentally, in the case of an image forming apparatus wherein two or more lasers are provided and a plurality of laser beams are used for image forming, it is possible to make a different image patch with each of plural laser beams and thereby to correct each laser with dot diameter correction means 2, or it is possible to make one image patch with plural laser beams (in this case, it is preferable that dots within an image patch having a fixed area are made with each of plural laser beams to be roughly in the same quantity) and thereby to correct plural lasers simultaneously with dot diameter correction means 2.

As stated above, maximum density level correction means 3 shown in FIG. 2 is a means to adjust developability by changing Vs/Vp representing a ratio of rotational frequency Vs of sleeve 31 to rotational frequency Vp of image carrier B, and thereby to determine the maximum density level, while, gradation correction means 4 is a means to adjust gradation by changing a pulse width of a laser with PWM and thereby to correct a γ curve. These maximum density level correction means 3 and gradation correction means 4 also make an image patch for correction use on image carrier B, then detect density level of the image patch with a density level sensor, and adjust the aforesaid Vs/Vp and a pulse width of PWM so that desired density level may be obtained, in the same way as in dot diameter correction means 2.

Incidentally, adjustment by means of maximum density level correction means 3 and gradation correction means 4 is conducted under the laser power value stored in the storage means 7.

Figure 4:
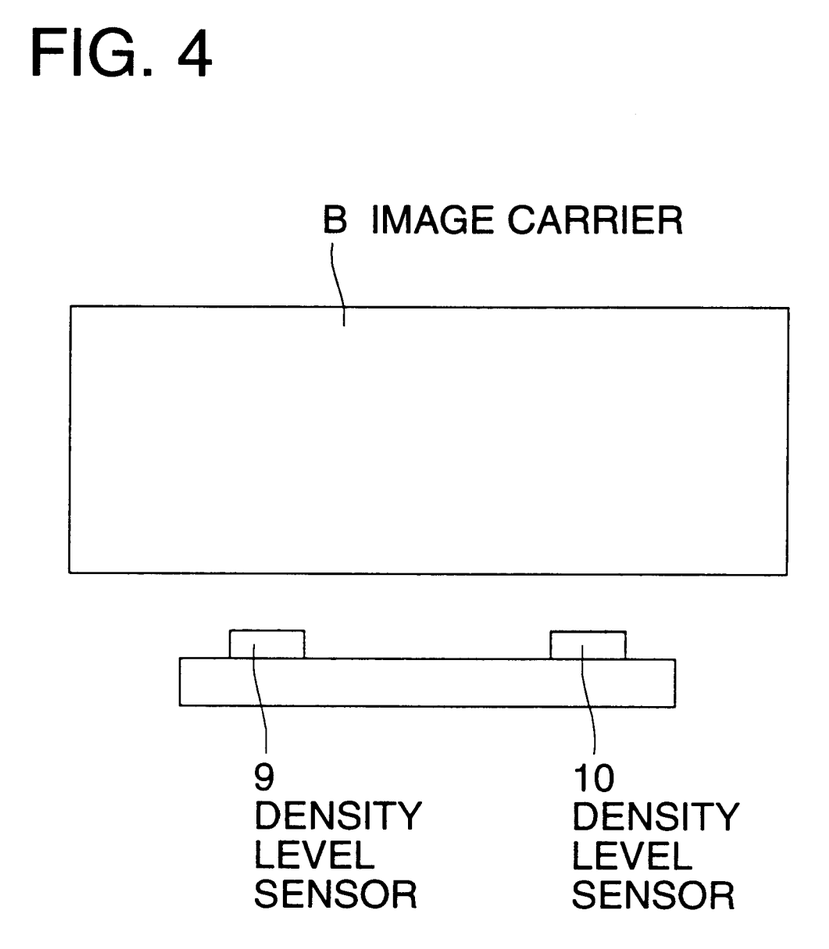
FIG. 4 is a diagram wherein each density level sensor is shown when image carrier B shown in FIG. 1 is viewed from its side.

FIG. 4 is a diagram wherein each density level sensor is shown when image carrier B shown in FIG. 1 is viewed from its side.

Density level sensor 9 is a density level sensor used in the maximum density level correction means 3 and it is a sensor arranged to have high sensitivity in the case of high density level. On the other hand, density level sensor 10 is a density level sensor used in the gradation correction means 4 and it is a sensor arranged to have high sensitivity in the case of medium density level. These density level sensors 9 and 10 are those which have been provided.

In the present embodiment, density level sensor C used in the dot diameter correction means 2 can be used as density level sensor 10 representing a density level sensor of gradation correction means 4 shown in FIG. 4, when density level of a halftone portion is detected. In this case, an image patch for dot diameter correction means 2 needs to be made on image carrier B to be in the same phase as that of an image patch for gradation correction means 4.

After the correction by means of the dot diameter correction means 2 has been completed, control means 1 conducts correction by means of the maximum density level correction means 3 and correction by means of the gradation correction means 4. With regard to the order of image adjustment, correction by means of the maximum density level correction means 3 and correction by means of the gradation correction means 4 are conducted after the laser power is adjusted and correction of dot diameter by means of dot diameter correction means 2 is conducted, as stated above. Further, after correction by means of the maximum density level correction means 3 and correction by means of the gradation correction means 4 are conducted, correction by means of dot diameter correction means 2 is not always needed. After correction by means of dot diameter correction means 2 is conducted, however, it is preferable that correction by means of the maximum density level correction means 3 and correction by means of the gradation correction means 4 are conducted.

It is preferable that correction by means of dot diameter correction means 2 is conducted periodically. For example, the correction can be conducted each time after a certain number of prints are made or each time after a certain period of time (for example, a period of time of accumulated value of rotating time for image carrier B, time for charging to be turned on, time of rotation for developing and rotating time for a polygon mirror). Further, it is preferable that the correction is conducted to follow the last sequence of printing so that the image forming sequence may not be interfered. On the contrary, it is not preferable to conduct correction by means of dot diameter correction means 2 when an amount of charging of developing agents is not stable such as the moment immediately after the power source for an image forming apparatus is turned on in the beginning of a working day.

When correction is conducted so that a value of laser power is greatly different from the previous value, after the correction by means of dot diameter correction means 2, it is preferable to use the value of laser power which has been used as it is, without conducting the correction. The reason for this is as follows. Deterioration of developing agents and contamination of a writing optical system to be corrected by dot diameter correction means 2 are considered to be changed incrementally, and when a value greatly different from its previous value is obtained, possibility of error is high.

Incidentally, in the embodiment above, correction is conducted by developing an image patch and by detecting its density level with density level sensor C. However, the invention is not limited to this, and it is possible, for example, to provide a voltage sensor which detects voltage of an image patch of a latent image written by writing unit A, and to conduct correction based on output of the voltage sensor. In this case, however, deterioration of developing agents can not be corrected, but a writing optical system is corrected.

As explained above, the invention has an effect that the writing optical system can be corrected by laser power, and thereby, a dot which is always constant in size can be formed.

Further, when correction is conducted by developing an image patch and thereby by detecting its density level with a density level sensor, it is possible to correct the change in a dot diameter caused by change in developability, and thereby to form a dot which is always constant in size, which is an effect.

Since a size of a dot can always be kept constant in the invention, an amount of consumption of toner can also be kept constant.

Further, the invention makes it possible to adjust laser power for the change in the maximum density level caused by contamination of a writing optical system and by change in developability, and it makes it possible to save a margin of adjustment width of Vs/Vp when adjusting Vs/Vp with the maximum density level correction means.

Further, since it is possible to correct a dot diameter by adjusting laser power and thereby to correct gradation by pwm modulation in the invention, it is possible to adjust independently and thereby to correct with less influence on others.

What is claimed is:

1. An image forming apparatus, comprising:

a photoreceptor;

exposure means having a power strength and for exposing the photoreceptor with a laser beam dot by dot so as to form a dotted latent image on the photoreceptor corresponding to image information;

developing means for developing the dotted latent image with developer; and dot diameter correcting means for correcting a diameter of the dot formed on the photoreceptor, the dot diameter correcting means including, image patch producing means for forming a test image patch having a specific dot pattern on the photoreceptor with a laser beam by the exposure means, image patch detecting means for detecting a density level of the test image patch formed on the photoreceptor, wherein when the image patch producing means forms a reference image patch having the same specified dot pattern with a dot having a redetermined diameter, the image patch detecting means detects a reference density level of the reference image patch, memory means for storing the reference density level corresponding to the predetermined diameter of the dot, and control means for comparing the detected density level of the test image patch with the reference density level and for controlling laser power strength of the exposure means so as to form the dot having the predetermined diameter.

2. The image forming apparatus of claim 1, wherein the dot pattern of the image patch is arranged such that each dot is substantially isolated from other dots so as not to superimpose with other dots.

3. The image forming apparatus of claim 1, wherein the dot pattern of the image patch is formed by one bit dot image with a predetermined number of dots.

4. The image forming apparatus of claim 2, wherein the image patch is a half tone image having a reflection density level of 0.2 to 0.6.

5. The image forming apparatus of claim 2, wherein the image patch detecting means comprises an image density level sensor to detect an average reflection density level of the image patch with diffused light.

6. The image forming apparatus of claim 1, wherein the image patch producing means produces plural different image patches with plural different laser power strengths and the image patch detecting means detects a density level of each of the plural different image patches.

7. The image forming apparatus of claim 6, wherein the memory stores correlated data between the plural different image patches and the plural different laser power strengths and the control means obtains a relationship among the correlated data and obtains a laser power strength corresponding to a desired density level.

8. The image forming apparatus of claim 1, further comprising:

maximum density level correcting means for adjusting a developing ability of the developing means and for determining the maximum density, wherein the control means conducts correction by the maximum density level correcting means based on the laser power strength corrected by the dot diameter correcting means.

9. The image forming apparatus of claim 1, further comprising:

gradation correcting means for correcting gradation characteristic by changing a pulse width of the laser beam, wherein the control means conducts correction by the gradation correcting means based on the laser power strength corrected by the dot diameter correcting means.

10. The image forming apparatus of claim 1, wherein the image patch detecting means comprises an image density level sensor to detect an average density level of the whole of the image patch.

11. The image forming apparatus of claim 10, wherein the image density level sensor detects the average density level by utilizing diffused light.

12. The image forming apparatus of claim 1, wherein the image patch producing means produces the image patch on the photoreceptor in such a manner that the exposure means forms a latent image on the photoreceptor and the developing means develops the latent image so as to form the image patch on the photoreceptor, and the image patch detecting means detects a reflection density level of the image patch on the photoreceptor.

13. The image forming apparatus of claim 1, wherein the image patch producing means produces the image patch on the photoreceptor in such a manner that the exposure means forms a latent image on the photoreceptor as the image patch, and the image patch detecting means detects a density level of the image patch by detecting an electric potential of the image patch on the photoreceptor.

14. The image forming apparatus of claim 1, wherein the image patch producing means produces plural different image patches with plural different laser power strengths and wherein the plural different image patches have the same number of dots respectively.

15. The image forming apparatus of claim 1, wherein the image patch producing means produces plural different image patches with plural different laser power strengths, the image patch detecting means detects a density level of each of the plural different image patches, and the control means obtains a laser power strength for a desired density level.

16. The image forming apparatus of claim 12, wherein the control means comprises a counter to count a number of image formations or to count hours used for image formation and controls the image patch producing means and the image patch detecting means so as to obtain a laser power strength for a desired density level for every predetermined number of image formations or for every predetermined hours used for image formations.

17. The image forming apparatus of claim 13, wherein the control means comprises a counter to count a number of image formations or to count hours used for image formation and controls the image patch producing means and the image patch detecting means so as to obtain a laser power strength for a desired density level for every predetermined number of image formations or for every predetermined hours used for image formations.

* * * * *